US009878845B2

(12) United States Patent
Thornton

(10) Patent No.: US 9,878,845 B2

(45) Date of Patent: Jan. 30, 2018

(54) CONTAINER COVER

(71) Applicant: Sheryl Lynn Thornton, Woodland Hills, CA (US)

(72) Inventor: Sheryl Lynn Thornton, Woodland Hills, CA (US)

( * ) Notice: Subject to any disclaimer, the term of this patent is extended or adjusted under 35 U.S.C. 154(b) by 46 days.

(21) Appl. No.: 15/201,297

(22) Filed: Jul. 1, 2016

(65) Prior Publication Data

US 2017/0001798 A1 Jan. 5, 2017

Related U.S. Application Data

(60) Provisional application No. 62/188,344, filed on Jul. 2, 2015.

(51) Int. Cl.
*B32B 7/06* (2006.01)
*B65F 1/14* (2006.01)

(52) U.S. Cl.
CPC ...................................... *B65F 1/14* (2013.01)

(58) Field of Classification Search
CPC .......... Y10T 428/24; Y10T 428/24008; B65D 65/06; B65D 65/08; B65D 65/22; B65F 1/14
See application file for complete search history.

(56) References Cited

U.S. PATENT DOCUMENTS

| | | | |
|---|---|---|---|
| 3,913,648 | A | 10/1975 | Sessler |
| 4,200,133 | A | 4/1980 | Whitlow |
| 5,709,312 | A | 1/1998 | Lake |
| 6,061,836 | A | 5/2000 | Peters |
| 6,062,412 | A | 5/2000 | Jacobsmeyer, Jr. |
| 6,508,282 | B2 | 1/2003 | Garofalo et al. |
| 2005/0076980 | A1 | 4/2005 | Hamdan |
| 2008/0035640 | A1 | 2/2008 | Weber |

*Primary Examiner* — Alexander Thomas

(57) ABSTRACT

The cover for a container having an outwardly projecting handle includes a skirt having a panel section for at least partially wrapping around the container. An attachment mechanism may be disposed on one end of the panel section and be selectively engageable with an opposite end of the panel section to retain the skirt around the container and below the outwardly projecting handle. The cover may also include a lip projecting inwardly about an upper periphery of the skirt having a size and shape relatively smaller than an upper rim of the container. In this respect, the lip is configured for slide-on engagement and support by the rim. Additionally, the cover includes a tab downwardly extending from the lip underneath the outwardly projecting handle for select engagement with the panel section such that the skirt, the panel section, the lip, and the tab cooperate to substantially cover the container.

24 Claims, 13 Drawing Sheets

CONTAINER COVER

BACKGROUND OF THE INVENTION

The present invention generally relates to a container cover. More specifically, the present invention relates to a flexible container cover that includes a skirt selectively attachable around the outer sidewalls of the container receptacle and a cap selectively attachable to a lid that couples to the receptacle about a hinge, the skirt and the cap couple to each other about the hinge to cooperatively substantially encompass the outer surface area of the container while simultaneously allowing the lid to pivot about the hinge between a closed position blocking access to the container interior and an open position providing access to the container interior.

There are a wide range of containers known in the art having a variety of shapes and sizes that may be used for different purposes. For example, refuse containers known in the art are preferably designed for single-user portability, while maximizing the capacity of the receptacle to limit the frequency the container needs to be emptied. In this respect, the refuse container may include a relatively large storage depository that includes at least a pair of wheels at one end conducive to wheeled movement by tipping the receptacle to one side. This is particularly desirable when the storage depository includes a volumetric capacity suitable for storing a relatively large amount of material (e.g., too much for a single person to pick up and carry alone). Accordingly, such refuse containers are typically stored outside and must be wheeled between the street (i.e., for pickup) and the house (i.e., for storage).

Since the refuse container generally sits outside or in the garage, and may retain trash therein for an extended duration (e.g., a week or more), it is desirable to close off the interior to enclose the trash and to keep animals out. This can be accomplished by a variety of lids designed to prevent outdoor exposure and ensure that the refuse container has a tidy and uniform exterior appearance. In the case of publicly-accessible refuse containers, some lids may even be used to advertise products and services. For example, lids known in the art may include a relatively large and possibly heavy plastic or metal lid that seats over an opening that provides access to the storage depository of the container. Such lids are typically configured to attach to the sidewalls of the storage repository. For example, in one embodiment, the outer periphery of the lid may be configured to attach substantially around the outer periphery of the storage depository. In another embodiment, the lid may be permanently attached to one sidewall, such as by way of a hinge or the like, and be pivotable between open and closed position. Such a hinged lid is particularly desirable since the lid always remains attached to the refuse container, thereby minimizing the potential for the lid to be separated from the refuse container and lost. The hinge allows for quick and easy opening and/or closing of the lid without the lid detaching from the container. Despite the ubiquity of containers and lids known in the art, containers with hinged lids present problems for the current art of container covers.

Container covers known in the art intended to provide a uniform exterior appearance either do not enable complete functionality of the refuse container or do not cover the entire refuse container, especially when used on containers with lids. Container covers often wrap around the exterior sidewalls of the storage depository to provide free access to the storage depository while leaving an attached container lid uncovered. This is not ideal, as the outward appearance of the container is not uniform, i.e., the side walls of the storage depository are aesthetically pleasing by being wrapped with a cover while the lid remains exposed. In particular, there are no methods known in the art for wrapping the outer sidewalls of the storage depository and a connected hinged lid, without inhibiting pivoting movement of the hinged lid. Thus, in these embodiments, part of the container is wrapped (i.e., the sidewalls of the storage depository) while other aspects of the container (i.e., the lid) remain unwrapped.

In other embodiments, the container cover may cover the entire container, but at the expense of the functionality of a hinged lid, i.e., the container cover may wrap around both the sidewalls of the storage depository and the lid, thereby inhibiting hinged movement of the lid relative to the storage depository. Gaining access to the interior of the storage depository requires detachment and/or removal of the container cover. Although, such container cover designs may intentionally lock the lid to the storage depository to limit opening and/or removal of the lid (e.g., to keep raccoons, squirrels, etc. from reaching the trash inside). Alternatively, other such container covers are designed only for aesthetic purposes and still significantly inhibit the operational characteristics of the container (e.g., repeatedly being able to open and access the internal cavity of the container). Either way, the usability of the container is hampered by way of blocking or otherwise restricting access to the container interior.

There exists, therefore, a significant need in the art for a container cover that completely covers the exterior sidewalls of the storage receptacle and a hinged lid coupled thereto, while simultaneously permitting opening and/or closing of the hinged lid without the need to remove and/or reattach the container cover each time one needs to access the inside of the storage receptacle. The present invention fulfills these needs and provides further related advantages.

SUMMARY OF THE INVENTION

A cover for a container having an outwardly projecting handle as disclosed herein may include a skirt having a panel section for at least partially wrapping around the container. The panel section may be made from a flexible fabric material and is preferably durable to withstand weather conditions such as high temperatures, rain, snow, etc. The skirt may further include an attachment mechanism on one end of the panel section that is selectively engageable with an opposite end of the panel section to retain the skirt around the container and below the outwardly projecting handle. In this respect, the skirt may basically surround a refuse container or the like. A lip projecting inwardly about an upper periphery of the skirt may have a size and shape relatively smaller than an upper rim of the container. Accordingly, such a lip is configured for slide-on engagement and support by the upper rim of the container so the skirt hangs therefrom. The lip may include a tab downwardly extending therefrom and positionable underneath the outwardly projecting handle for select engagement with the panel section such that the skirt, the panel section, the lip, and the tab cooperate to substantially cover the container, including in and around the outwardly projecting handle.

In another aspect of this embodiment, the panel section may include a front panel section and a pair of oppositely facing attachment flaps, wherein the attachment mechanism is designed to selectively secure the pair of attachment flaps below the outwardly projecting handle. More specifically, the attachment mechanism may include an inner attachment strip coupled with one of the attachment flaps and an outer attachment strip coupled to another of the attachment flaps. Here, one of the inner attachment strip or the outer attachment strip may include a plurality of hooks and the other of the inner attachment strip or the outer attachment strip may include a plurality of hoops engageable by the plurality of hooks. The panel section may further include an upper attachment strip selectively attachable to an inner attachment strip of the tab extending underneath the outwardly projecting handle.

The tab may include an outer attachment strip selectively engageable with a cap having a size and shape to selectively encompass a lid pivotally coupled to the outwardly projecting handle. The cap may include an outer periphery that is selectively expandable and/or contractible to increase the diameter (or width) of the cap to fully encompass the lid, then contract the outer periphery about the lid to ensure the cap remains snugly engaged with the lid. In this respect, the cap may further include an elastic cinching band that facilitates said expanding and/or contracting of the outer periphery of the cap. In one embodiment, the elastic cinching band may include a stop for maintaining the portion of the outer periphery in a contracted position so the cap remains engaged with the lid until the stop is released and the cinching band permits expansion of the outer periphery of the cap.

The cap may also include a relatively rigid and outwardly presented extension having at least one longitudinal strip of material hanging therefrom and at least partially obscuring the elastic cinching band. Here, the longitudinal strip of material hanging from the outwardly presented extension may extend downwardly and inwardly from the extension and toward the skirt. Moreover, the cap may also include a fastener for select attachment and retention with the outer attachment strip. In this respect, in one embodiment, the cap may include a rear end with the fastener thereon and having a size and shape to extend out from the lid, over the outwardly projecting handle and into contact with the outer attachment strip. As such, the cap covers the lid and the outwardly projecting handle while simultaneously permitting pivoting movement of the lid relative to the handle without interference from the cap or the skirt.

The skirt may include at least one pleat having a size and shape to fit over and accommodate rolling motion of an underlying wheel. The skirt may additionally include a pair of longitudinal edges transitioning the front panel section to the respective pair of attachment flaps at an angle of approximately 70 to 100 degrees. The skirt, the lip, and/or the tab may be made from a flexible, yet durable material, such as a fabric, a polymer, or a foil material.

In another embodiment as disclosed herein, the cover for a container having an outwardly projecting handle may include a skirt having a panel section and a pair of oppositely facing attachment flaps for at least partially wrapping around the container. An attachment mechanism may be disposed on at least one end of one of the pair of oppositely facing attachment flaps and be selectively engageable with the other of the pair of oppositely facing attachment flaps to retain the skirt around the container and below the outwardly projecting handle. A lip may project inwardly about an upper periphery of the skirt and have a size and shape relatively smaller than an upper rim of the container, the lip being configured for slide-on engagement and support by the upper rim. A tab may downwardly extend from the lip and be positioned underneath the outwardly projecting handle and include an outer attachment strip. A cap having a size and shape to selectively encompass a lid pivotally coupled to the outwardly projecting handle may include a rear end with a fastener thereon that extends out from the lid, over the outwardly projecting handle and into select attachment and retention with the outer attachment strip of the tab such that the skirt, the panel section, the attachment flaps, the lip, the tab, and the cap cooperate to substantially cover the container, including in and around the outwardly projecting handle, while simultaneously permitting pivoting movement of the lid relative to the handle without interference from the cover.

In another aspect of this embodiment, the attachment mechanism may include an inner attachment strip coupled with one of the oppositely facing attachment flaps and an outer attachment strip coupled to another of the oppositely facing attachment flaps. Here, one of the inner attachment strip or the outer attachment strip may include a plurality of hooks and the other of the inner attachment strip or the outer attachment strip may include a plurality of hoops engageable by the plurality of hooks.

A pair of longitudinal edges may transition the panel section to the respective pair of attachment flaps at an angle of approximately 70 to 100 degrees. This permits the cover to more closely conform to the outer sidewalls of a refuse container of similar size and/or shape. Each of the oppositely facing attachment flaps may include a respective upper attachment strip selectively attachable to an inner attachment strip of the tab extending underneath the handle so that the attachment flaps remain engaged with one another, and in adjacent relation to the refuse container sidewalls.

A portion of an outer periphery of the cap may be selectively expandable and/or contractible about the lid with an elastic cinching band, the elastic cinching band including a stop for maintaining the portion of the outer periphery in a contracted position. The cap may also include a relatively rigid and outwardly presented extension forming at least a relatively straight front edge, a relatively straight right edge, and a relatively straight left edge with each of the straight, right, and left edges having a longitudinal strip of material hanging therefrom and substantially concealing the elastic cinching band thereunder. Additionally, the skirt, the lip, or the tab may be made from a flexible and durable material such as a fabric material, a polymer material, and/or a foil material. The skirt may include at least one pleat having a size and shape to fit over and accommodate rolling motion of an underlying wheel, especially when the skirt is made from a flexible material, as opposed to a more rigid material (e.g., plastic) that may just house the wheel.

In another embodiment of the cover for a container having an outwardly projecting handle as disclosed herein, the skirt includes a front panel section and a pair of attachment flaps for at least partially wrapping around the container, wherein each of the attachment flaps include an upper attachment strip. An inner attachment strip may be coupled to one of the pair of attachment flaps and an outer attachment strip may be coupled to another of the pair of attachment flaps such that the inner and outer attachment strips are selectively engageable with one another to retain the skirt around the container and below the outwardly projecting handle. A lip may project upwardly and inwardly about an upper periphery of the skirt and have a size and shape relatively smaller than an upper rim of the container, the lip being configured for slide-on engagement and support by the rim. A tab may downwardly extend from the lip underneath the outwardly projecting handle and include a lower attachment strip for select engagement with the upper attachment strip.

A cap having a size and shape to selectively encompass a lid pivotally coupled to the outwardly projecting handle may include a fastener extending out from the lid, over the outwardly projecting handle and into select attachment with the tab. A portion of an outer periphery of the cap may be selectively expandable and/or contractible about the lid, wherein the skirt, the front panel section, the pair of attachment flaps, the lip, the tab, and the cap cooperate to substantially cover the container, including in and around the outwardly projecting handle, while simultaneously permitting pivoting movement of the lid relative to the handle. The cap may include an elastic cinching band for expanding and/or contracting the portion of the outer periphery of the cap, the elastic cinching band including a stop for maintaining the portion of the outer periphery in a contracted position. In this respect, the cap may also include at least one extension segment projecting outwardly from the cap and having at least one hanging segment projecting downwardly from an outer most edge of the at least one extension segment.

A pair of longitudinal edges may transition the front panel section to the respective pair of attachment flaps at an angle of approximately 70 to 100 degrees, wherein one of the inner attachment strip or the outer attachment strip includes a plurality of hooks and the other of the inner attachment strip or the outer attachment strip includes a plurality of hoops engageable by the plurality of hooks. The skirt, the lip, and/or the tab may include a flexible material selected fabric, a polymer, or a foil material. The skirt may further include at least one pleat having a size and shape to fit over and accommodate rolling motion of an underlying wheel.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
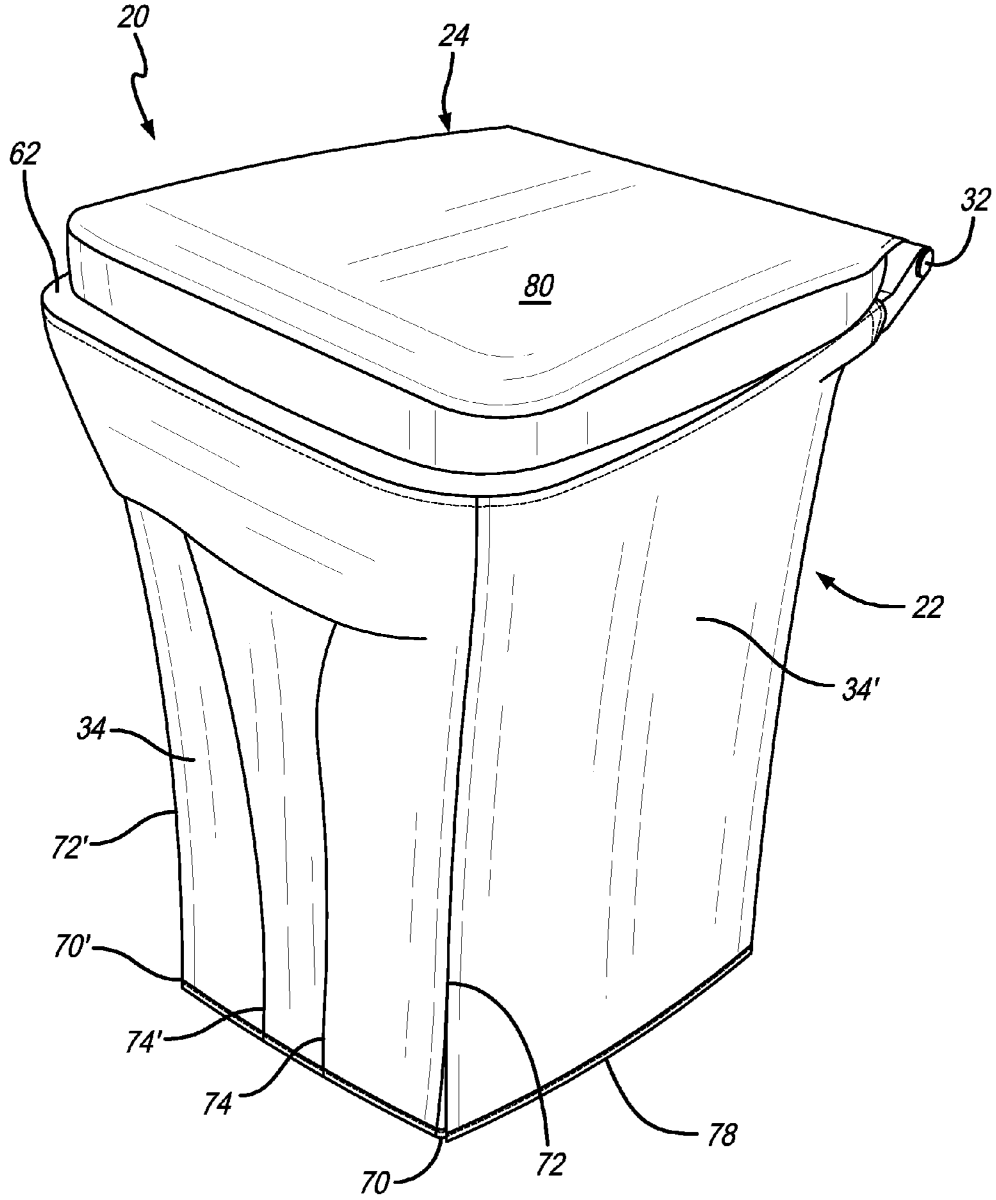
FIG. 1 is a front perspective view of one embodiment of a container cover as disclosed herein, fully installed on a refuse container having a hinged lid.
Figure 2:
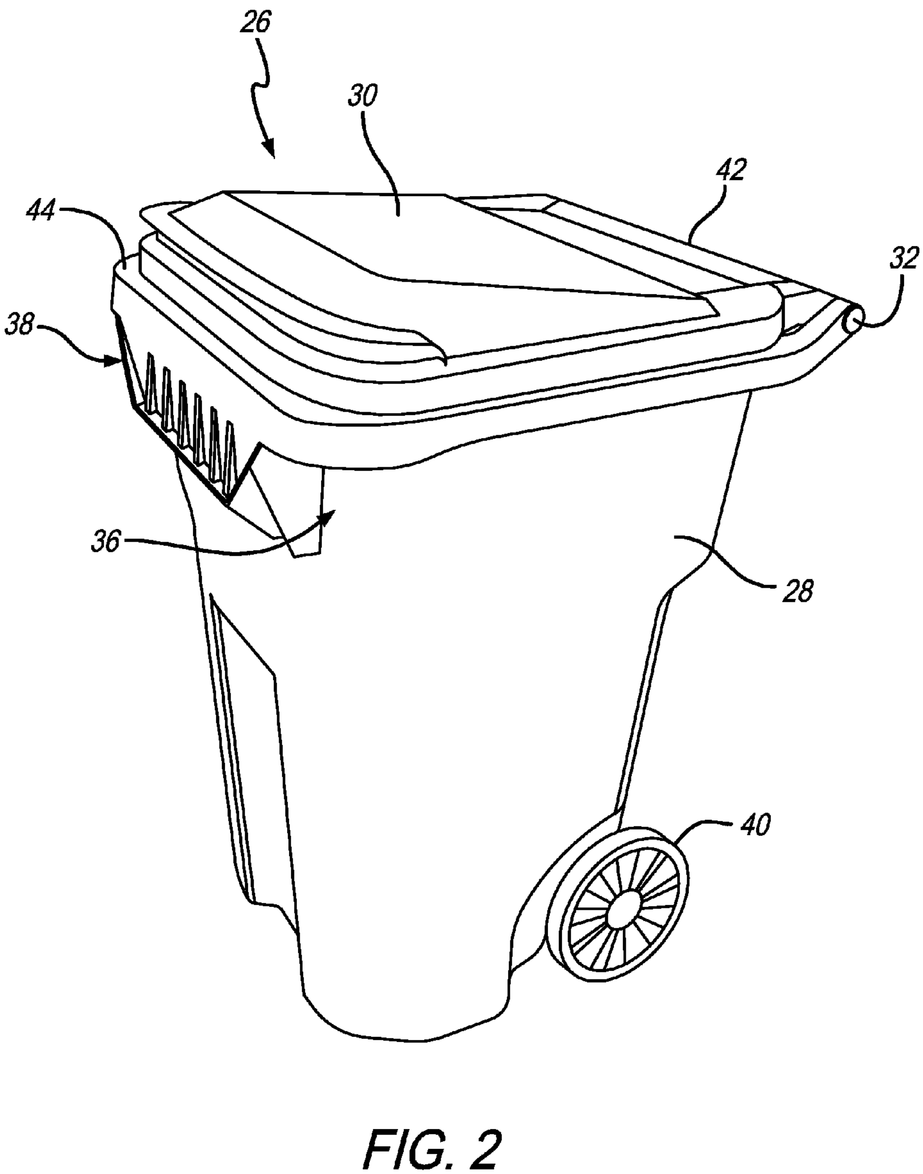
FIG. 2 is a perspective view of the refuse container of FIG. 1 without the container cover thereon, further illustrating the hinged lid, an integrated handle, and one of a pair of lower wheels.

As shown in the exemplary drawings for purposes of illustration, one embodiment of a container cover as disclosed herein is generally referred to by reference numeral 20 in FIG. 1. As shown in FIGS. 1 and 2, the container cover 20 may generally include a lower skirt 22 and an upper cap 24 that cooperate to substantially envelope or otherwise wrap around and cover a refuse container 26 or the like. The skirt 22 may have a size and shape for substantially wrapping around the sidewalls of a receptacle 28 of the refuse container 26 and the cap 24 may be of a size and shape to substantially wrap around and secure to a lid 30 (FIG. 2) of the refuse container 26. The lid 30 may further couple to the receptacle 28 by way of a pair of hinges 32, 32' (best shown in FIGS. 3-7). As shown in FIGS. 1,3-7, and 9-12, the skirt 22 may include a series of panel sections 34, 34', 34" that substantially envelope or wrap around the front and sidewalls of the receptacle 28. When installed, the skirt 22 may conform to the receptacle 28 such as following the contours of an indentation 36 and/or a protrusion 38 in the receptacle 28. The skirt 22 may also be designed to accommodate covering a pair of wheels 40 (one of a reciprocal pair of the wheels 40 being shown in FIG. 2). Additionally, the skirt 22 should be configured to wrap in and around an outwardly projecting handle 42 (FIGS. 3-7), such that the skirt 22 substantially covers the entire outer surface area of the receptacle 28. Accordingly, the lid 30 should be able to pivot about the hinges 32, 32' between a closed position resting on or otherwise coupled with a rim 44 of the receptacle 28 to cover an aperture 46 that provides access to an interior of the receptacle 28, and an open position providing access to the interior of the receptacle 28 through the aperture 46, all without the need to remove the container cover 20 from the refuse container 26.

Figure 4:
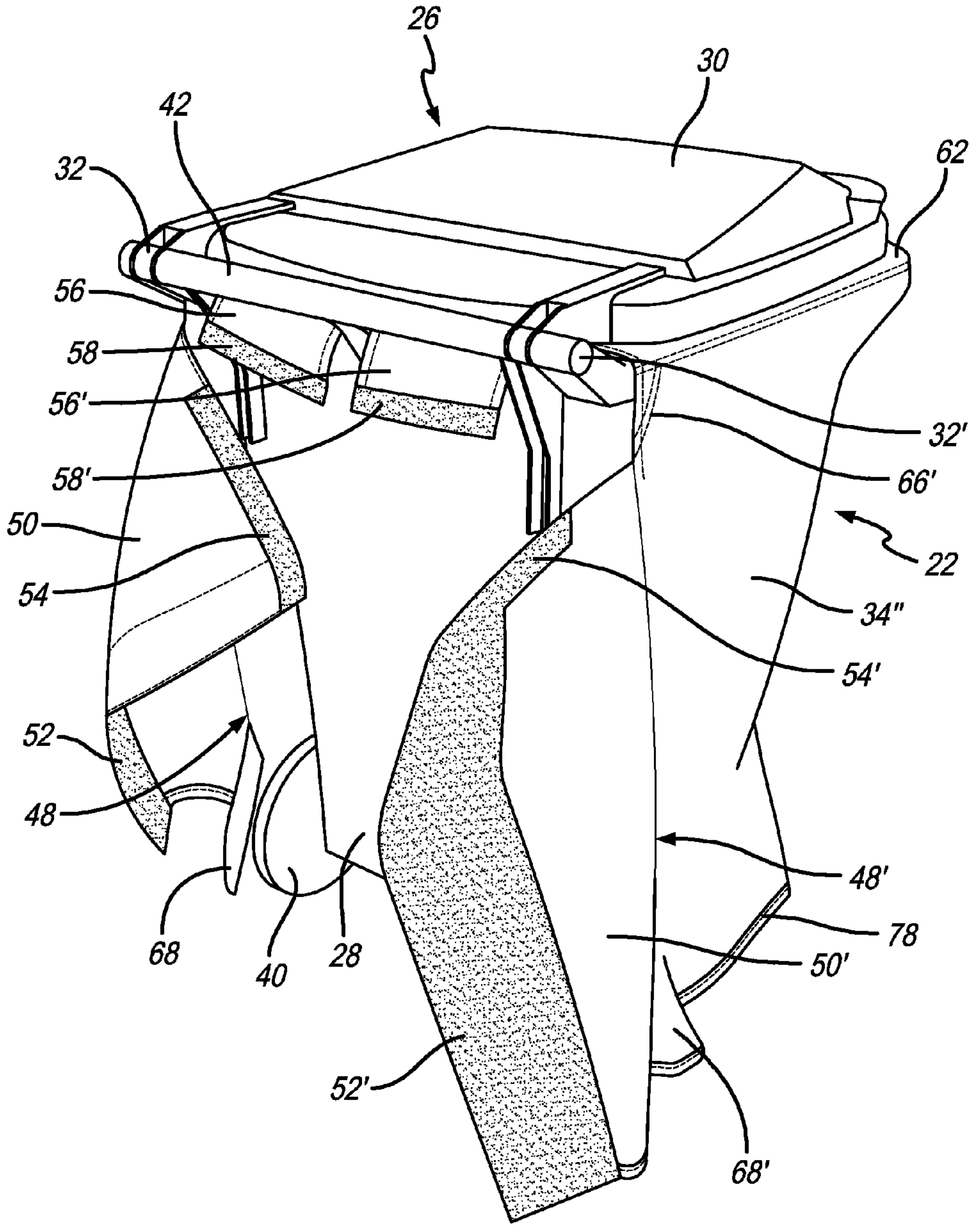
FIG. 4 is a rear perspective view illustrating the lower skirt more fully wrapped around the front and side walls of the receptacle, with an unfastened set of attachment flaps positioned beneath the integral handle.
Figure 5:
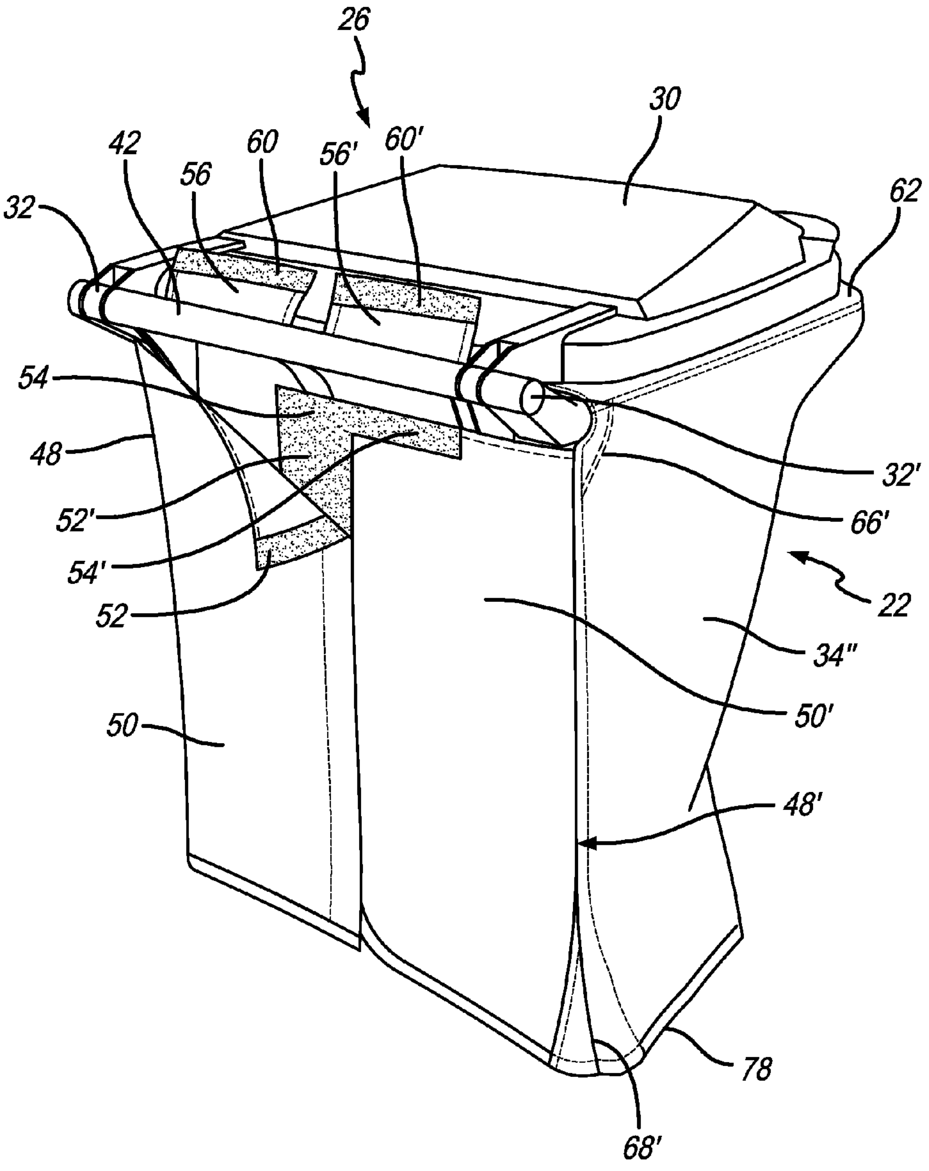
FIG. 5 is a rear perspective view of the refuse container fully wrapped by the lower skirt, and further illustrating partial fastening of the attachment flaps positioned beneath the integral handle.
Figure 6:
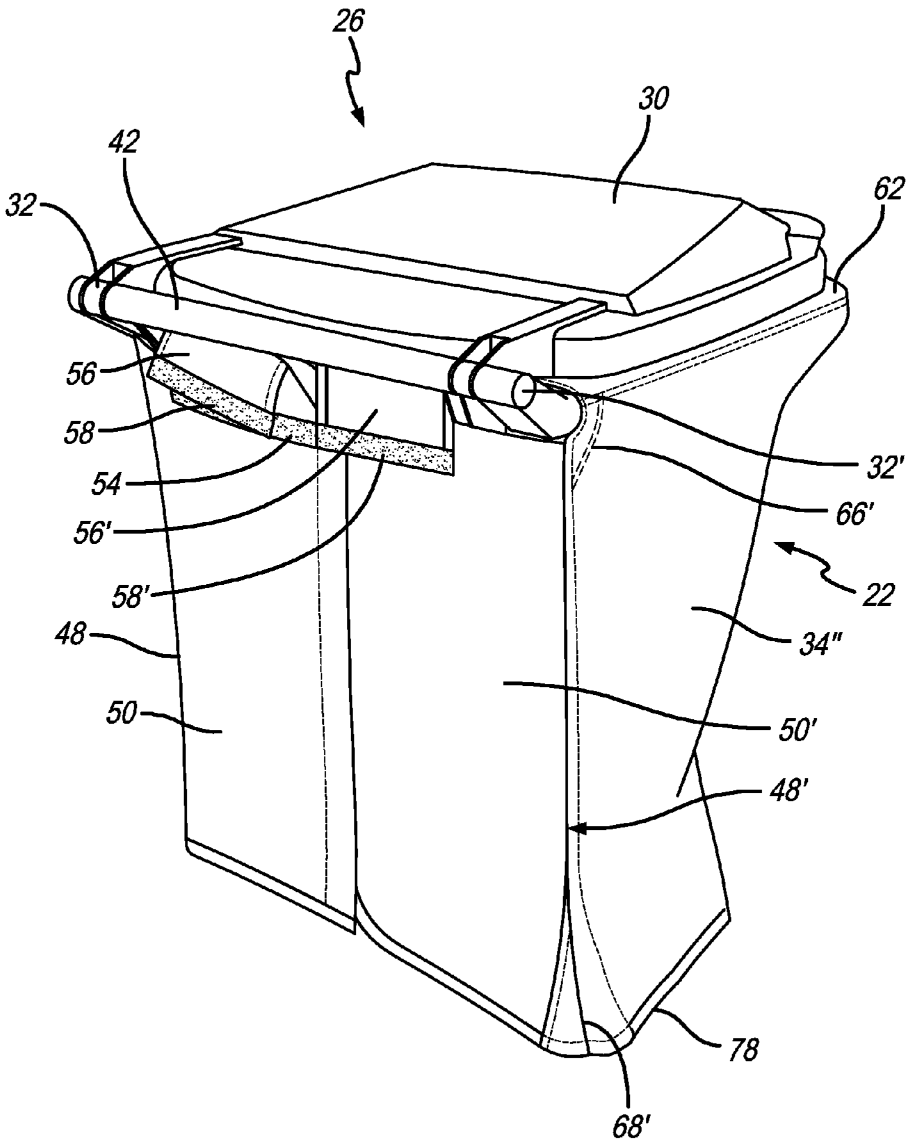
FIG. 6 is a rear perspective view of the refuse container fully wrapped by the lower skirt, and further illustrating a set of anchor tabs threaded beneath the integral handle and partially-secured to the attachment flaps.

In the embodiments disclosed herein, the panel sections 34, 34', 34" of the skirt 22 are shown as being substantially rectangular so as to conform to the outer sidewalls of the receptacle 28. Of course, the skirt 22 may include various combinations of the discrete panel sections 34, 34', 34" (e.g., none, less than three, three, or more than three, etc.) depending on the structure of the refuse container 26 (e.g., the number of discrete sidewalls). For example, in one alternative embodiment, the container cover 20 may include a single panel section 34 substantially round so as to fit snugly to a cylindrical trash can or the like. As illustrated in FIGS. 4-6, the front panel section 34 couples with or is otherwise adjacent to each of the right and left panel sections 34', 34". The right and left panel sections 34', 34" include a respective longitudinal edge 48, 48' opposite the front panel section 34 that selectively couples with (e.g., by sewn engagement) a respective set of attachment flaps 50, 50' that are configured to selectively engage one another to hold the skirt 22 around the outer periphery of the refuse container 26, e.g., as shown in FIGS. 1 and 6. In this respect, the longitudinal edges 48, 48' may provide a transition point (e.g., a seamed corner) between the panel sections 34', 34" and the attachment flaps 50, 50' that allow the attachment flaps 50, 50' to wrap around behind the back of the receptacle 28 in the manner shown progressively from FIG. 4 to FIG. 5.

The attachment flaps 50, 50' may selectively engage with one another via a set of longitudinal hook and loop strips 52, 52' (e.g., sewn on to each of the attachment flaps 50, 50'), thus enabling opposite sides of the skirt 22 to substantially wrap around or otherwise encompass the outer sidewalls of the receptacle 28 in engaged relation. For example, in the embodiment disclosed herein, the attachment flap 50' may include an outer longitudinal hook and loop strip 52', while the attachment flap 50 may include a reciprocal inner hook and loop strip 52. As such, the attachment flaps 50, 50' wrap around behind the receptacle 28 such that the attachment flap 50' is flush against a sidewall of the receptacle 28 and positioned underneath the attachment flap 50, as shown in FIG. 5. In this respect, the outwardly facing outer hook and loop strip 52' aligns with the inwardly facing inner hook and loop strip 52 for select engagement with one another to hold the skirt around the outer periphery of the refuse container 26. Of course, either of the strips 52, 52' may include the "hooks" or the "straps", or a combination of both. Furthermore, in an alternative embodiment, the strips 52, 52' may include another material that permits select engagement and/or release, or the attachment flaps 50, 50' may incorporate another form of attachment mechanism, such as a zipper sewn into a side edge of each of the attachment flaps 50, 50'.

The attachment flaps 50, 50' may also include a pair of lateral hook and loop strips 54, 54' positioned toward an upper edge of the attachment flaps 50, 50' and above the longitudinal hook and loop strips 52, 52'. In this respect, the lateral hook and loop strips 54, 54' remain exposed after the longitudinal hook and loop strips 52, 52' engage one another as substantially shown in FIG. 5. As such, the lateral hook and loop strips 54, 54' may be selectively positioned up underneath the handle 42 to selectively engage with a pair of anchoring tabs 56, 56' that project downwardly behind the handle 42 as shown, e.g., in FIG. 4. The anchoring tabs 56, 56' may include a pair of outer hook and loop strips 58, 58', as shown in FIG. 4, and a pair of inner hook and loop strips 60, 60', as shown in FIG. 5. More specifically, when the skirt 22 is attached to the receptacle 28, the inner hook and loop strips 60, 60' preferably align with the exposed lateral hook and loop strips 54, 54' for attachment thereto. This provides covering and stability for the skirt 22 in the area in, around, and underneath the handle 42. Of course, either of the strips 54, 54' or the strips 60, 60' may include the "hooks" or the "loops", or a combination of both. Furthermore, in an alternative embodiment, either of the strips 54, 54' or the strips 60, 60' may include another material that permits select engagement and/or release, such as adhesive or snap-fit connectors. The anchoring tabs 56, 56' may alternatively be connected to the attachment flaps 50, 50' via a zipper. Additionally, each of the anchoring tabs 56, 56' may further include a pair of outer hook and loop strips 58, 58', as shown in FIG. 4, that remain exposed for connection to the cap 24, as described in more detail below.

The skirt 22 may further include a continuous upper inwardly projecting lip 62 designed to suspend the container cover 20 from the refuse container 26. In this respect, in one embodiment, the lip 62 may track the periphery of the rim 44 and include a lower peripheral edge somewhat larger in width (or diameter if the refuse container is cylindrical) that is coupled to (e.g., sewn together) each of the panel sections 34, 34', 34" and the anchoring tabs 56, 56', as shown best in FIGS. 3 and 4, to suspend the same around the aperture 46 of the refuse container 26. Moreover, the lip 62 may generally taper inwardly from this lower peripheral edge to a somewhat smaller upper peripheral edge that tracks the contour of or otherwise hugs the rim 44. In this respect, the upper peripheral edge of the lip 62 is smaller in width (or diameter if the refuse container 26 is cylindrical) relative to the rim 44 so that the weight of the panel sections 34, 34', 34" and the anchoring tabs 56, 56' coupled thereto pull the skirt 22 downwardly by gravitational force so the lip 62 sits along the rim 44. The size and shape of the panel sections 34, 34', 34" may conform to the exterior surface of the receptacle 28 when suspended by the lip 62 as shown and described herein.

Figure 3:
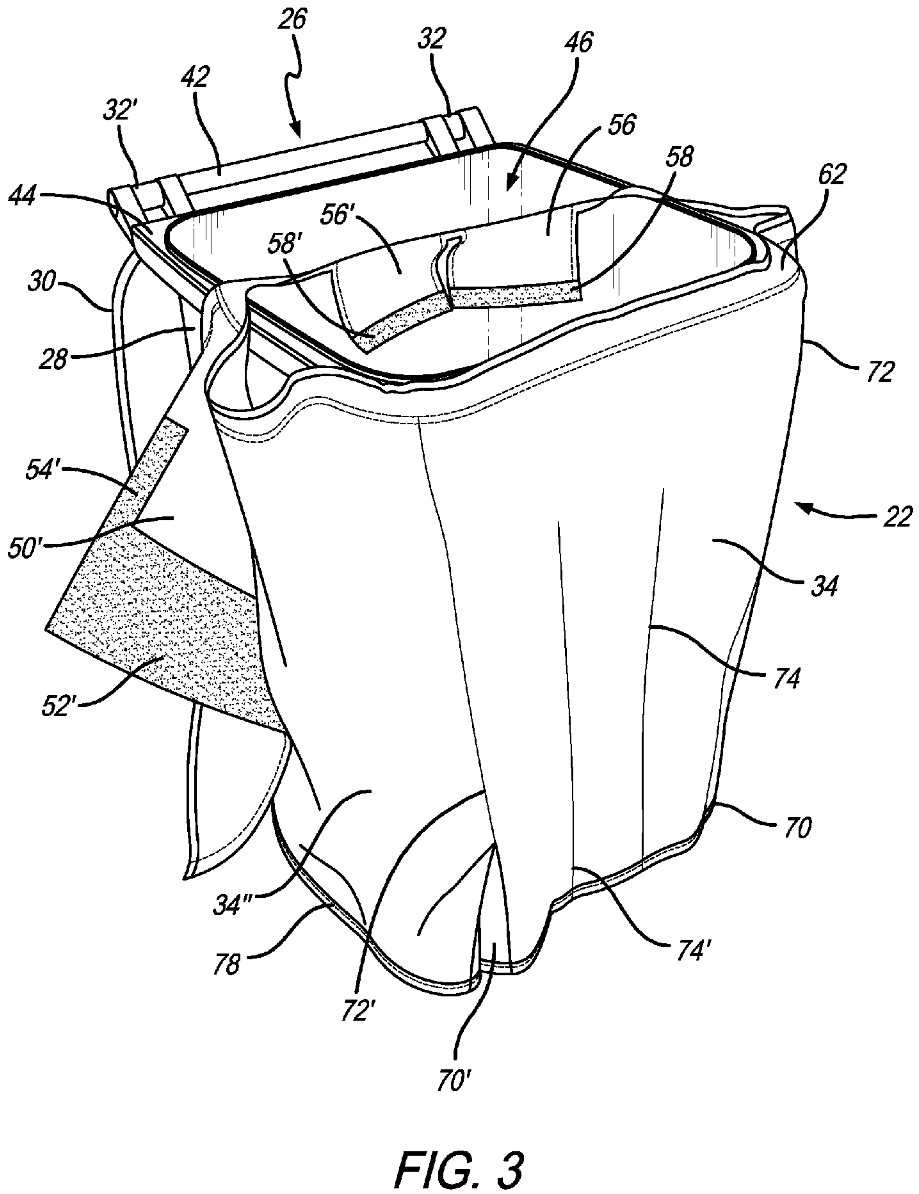
FIG. 3 is a front perspective view illustrating wrapping a lower skirt of the container cover around the outer sidewalls of the container receptacle.

As shown progressively from FIG. 3 to FIG. 5, the lip 62 may be a continuous piece of material (e.g., a band) that can be progressively engaged with the rim 44. For example, the part of the lip 62 coupled to the front or center panel section 34 may first be disposed over a reciprocal section of the rim 44, followed by progressively wrapping the lip 62 around the periphery of the rim, such as along the rim 44 adjacent the right and/or the left panel sections 34', 34", and the anchoring tabs 56, 56'. As best shown in FIG. 3, the anchoring tabs 56, 56' may be sewn or otherwise attached to the lip 62 at an inward position from the right and/or left panel section 34', 34" to provide clearance for the handle 42 to attach directly to the receptacle 28. That is, the skirt 22 includes a break between the downwardly extending right and left panel sections 34', 34" (e.g., along the longitudinal hook and loop strips 52, 52') and the downwardly extending anchoring tabs 56, 56'. This allows the skirt 22 to wrap in and around the outer peripheral surface of the receptacle 28, and specifically around the portion of the handle 42 directly connected to the receptacle 28. Accordingly, the anchoring tabs 56, 56' are shown in FIG. 4 downwardly extending between the receptacle 28 and the outwardly extending handle 42. Furthermore, FIG. 5 illustrates the anchoring tabs 56, 56' in a raised position underneath the handle 42 to permit attachment of the attachment flap 50 to the attachment flap 50' about the respective longitudinal hook and loop strips 52, 52'. Next, as progressively shown from FIG. 5 to FIG. 6, the inner hook and loop tabs 60, 60' positioned underneath the raised anchoring tabs 56, 56' are moved downwardly and toward the receptacle 28 for eventual engagement with the externally exposed lateral hook and loop strips 54, 54' to snugly secure the skirt 22 to the receptacle 28.

While the panel sections 34, 34', 34", the attachment flaps 50, 50', and the anchoring tabs 56, 56' have been described herein with respect to a flexible fabric material, each may also be made from other materials known in the art, such as a flexible polymer or foil material. Flexible polymer or foil material may allow the lower skirt 22 to remain flexible while still closely fitting the receptacle 28 regardless of its shape. Alternatively, the lower skirt 22 may be formed from a more rigid polymer or metallic material, thus requiring more stringent accommodation of any geometrical disruptions in the continuity of the planar surface sidewalls of the receptacle 28 (e.g., the aforementioned indentation 36 or/or the protrusion 38).

As briefly mentioned above, the lower skirt 22 is installed by first positioning the lip 62 onto the rim 44 and around the aperture 46, as initially shown in FIG. 3. Here, the lip 62 rests on the container rim 44, thus suspending the free-hanging and relatively loose skirt 22. While the lip 62 provides stability, the panel sections 34, 34', 34" and the attachment flaps 50, 50' wrap around the receptacle 28, as shown in FIGS. 3-4, while also tracking placement of the lip 62 with the rim 44 along these sections, as described above. Once around, the attachment flaps 50, 50' engage one another via the longitudinal hook and loop strips 52, 52', as shown in FIG. 5. Once the attachment flaps 50, 50' engage, the anchoring tabs 56, 56' may be moved downwardly from the position shown in FIG. 5 to the position shown in FIG. 6, and behind the handle 42, so the inner hook and loop strips 60, 60' engage the lateral hook and loop strips 54, 54', thereby fully securing the lower skirt 22 around the receptacle 28 and the rim 44, while leaving the container aperture 46, the handle 42, and the hinges 32, 32' fully exposed, as best shown in FIGS. 6 and 7.

The skirt 22 may further include a pair of reinforcing seams 66, 66' to strengthen the rigidity of the respective panel sections 34', 34" near the hinges 32, 32'. As shown best in FIGS. 4-6, the reinforcing seams 66, 66' extend approximately between the longitudinal edges 48, 48' and the lip 62. The reinforcing seams 66, 66' may not be needed if the skirt 22 is made from a relatively inflexible polymer or metallic material prone to less wear in this area. In this alternative embodiment, the reinforcing seams 66, 66' may be substituted for an additional layer of durable material (not shown) to reinforce this area of the skirt 22. Additionally, as best shown in FIGS. 5 and 6, the skirt 22 may include a set of rear pleats 68, 68', e.g., sewn between the respective panel sections 34', 34" and the attachment flaps 50, 50' and generally opening the longitudinal edges 48, 48' near the bottom of the skirt 22 to provide room for the wheels 40 (FIG. 2). As such, the rear pleats 68, 68' permit the portion of the skirt 22 covering the wheels 40 to extend outwardly, thereby allowing the wheels 40 to freely rotate underneath. This allows the refuse container 26 to be tilted and rolled to a new location by way of the wheels 40, as described above. Moreover, such movement can be accomplished without necessarily removing the skirt 22 from the receptacle 28. The rear pleats 68, 68' provide the requisite slack in the skirt 22 to ensure that the panel sections 34', 34" and/or the attachment flaps 50, 50' do not rub the wheels 40.

Figure 7:
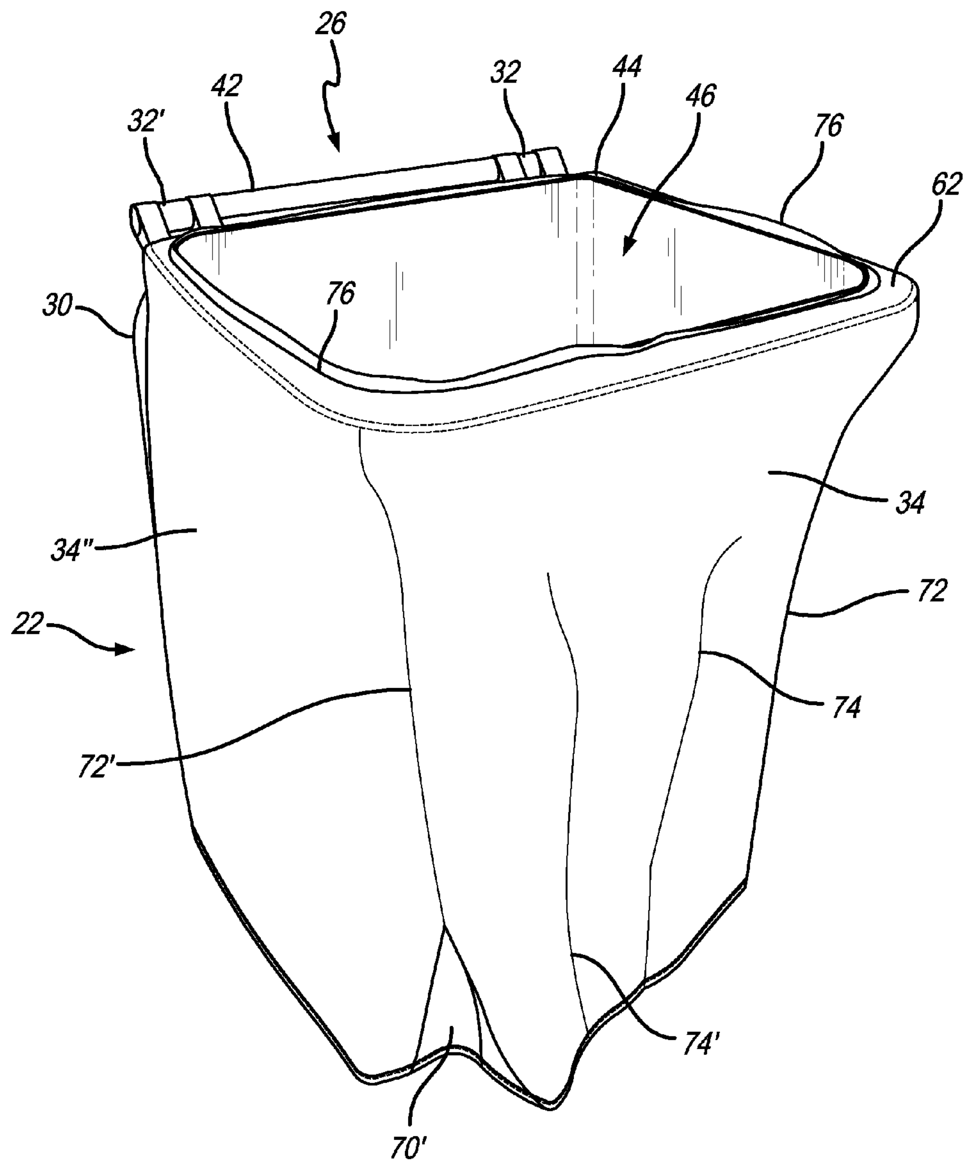
FIG. 7 is a front perspective view illustrating the container wrapped with the lower skirt simultaneously while the hinged lid is in an open position exposing an inner cavity of the container receptacle.
Figure 11:
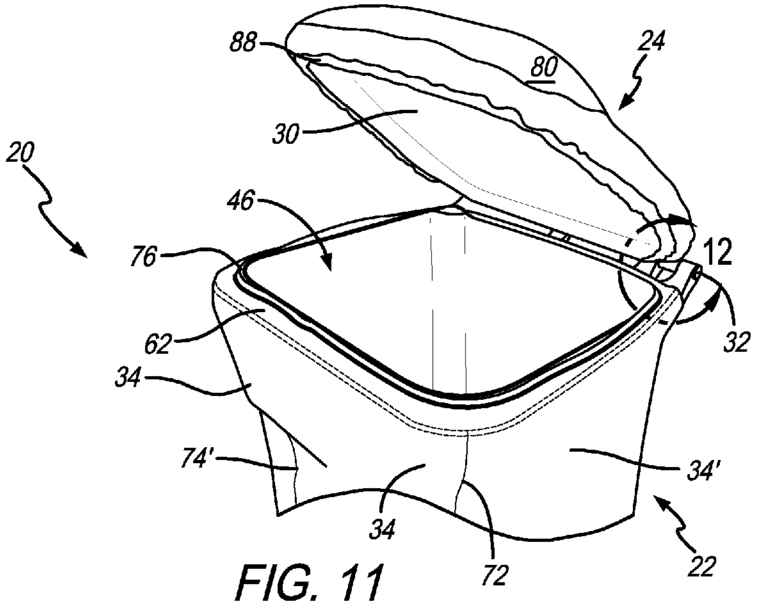
FIG. 11 is a front perspective view of the container cover fully installed onto the refuse container, wherein the hinged lid is partially open thereby exposing the internal cavity of the receptacle.
Figure 12:
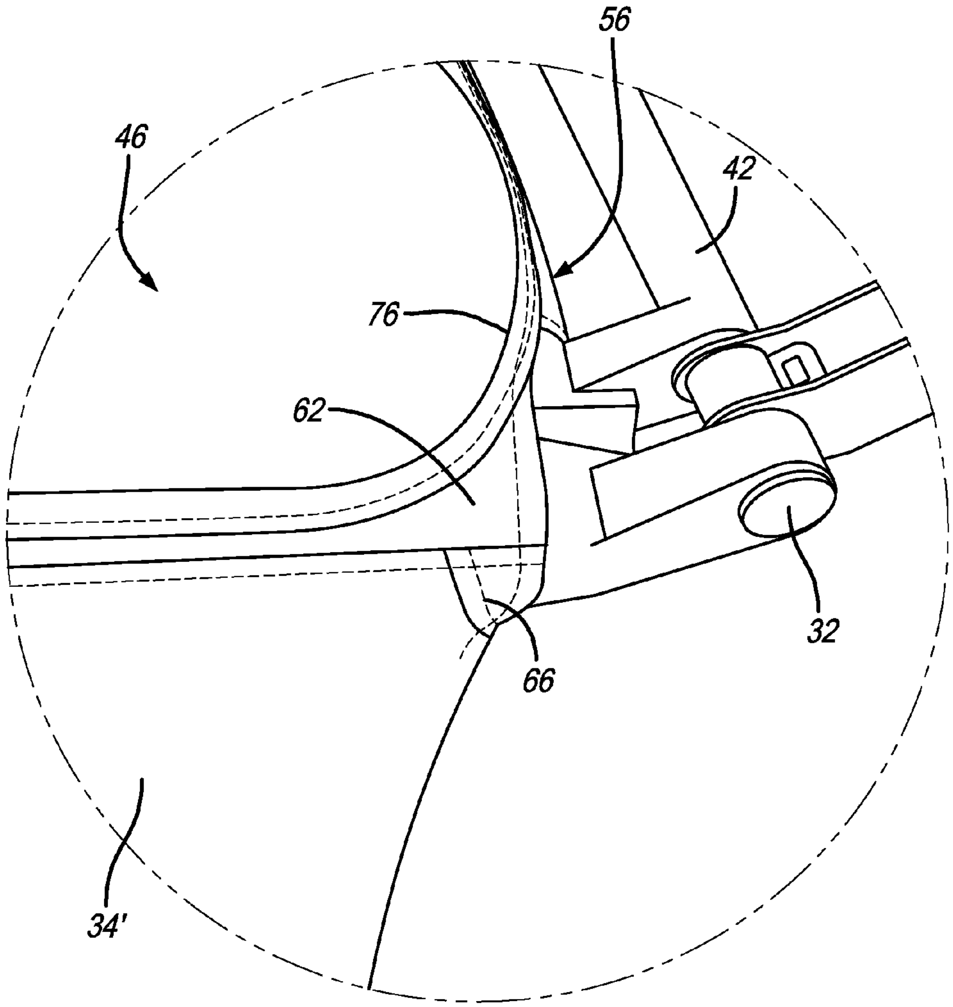
FIG. 12 is an enlarged front perspective taken about the circle 12 in FIG. 11, further illustrating a reinforcing seam and the lip in relation to the refuse container handle and hinged lid.

As shown in FIGS. 1, 3, and 7, the skirt 22 may also include a pair of front pleats 70, 70' that provide additional room to the front of the skirt 22. Additionally, the skirt 22 may include a pair of front longitudinal seams 72, 72' stitched or otherwise formed therein to pull together the front panel section 34 with the right and left side panel sections 34, 34", thereby engaging the skirt 22 to the receptacle 28 in relatively tight fitting arrangement above the front pleats 70, 70'. A pair of darts 74, 74' may further be sewn into the front panel section 34 to further conform the skirt 22 to the shape of the receptacle 28. As best shown in FIGS. 7, 11, and 12, a relatively durable lip hem 76 may be sewn onto the lip 62 to prevent the lip 62 from fraying after extended use and to ensure that the shape of the lip 62 remains consistent when installed around the container aperture 46 over the rim 44. A bottom hem 78 (FIGS. 4-6) may be sewn onto a lower portion of the panel sections 34, 34', 34" and the attachment flaps 50, 50' opposite the lip 62 to prevent fraying over time. Once fully attached, the container cover 20 may ensure that the refuse container 26 is substantially covered, thereby enhancing its visual appearance. In this respect, a substantially form-fitting skirt 22 conforming to the receptacle 28 may be desired as it may be perceived to present a more attractive appearance, at least relative to a relatively looser fitting skirt 22.

Of course, the container cover 20 may be designed with any number of the aforementioned features, including, but not limited to, one or more of the panel sections 34, 34', 34", the longitudinal edges 48, 48', the attachment flaps 50, 50', the longitudinal hook and loop strips 52, 52', the lateral hook and loop strips 54, 54', the anchoring tabs 56, 56', the outer hook and loop strips 58, 58', the inner hook and loop tabs 60, 60', the reinforcing seams 66, 66', the rear pleats 68, 68', the front pleats 70, 70', the longitudinal seams 72, 72', the darts 74, 74', the lip hem 76, and/or the bottom hem 78. In this respect, such features could be excluded from the container cover 20, could be mixed and/or matched together, and/or could all be included in the design of the container cover 20. In another aspect, the longitudinal hook and loop strips 52, 52' may only partially engage, thus leaving additional room for the attachment flaps 50, 50' for each of attaching the lower skirt 22 around the receptacle 28.

Figure 8:
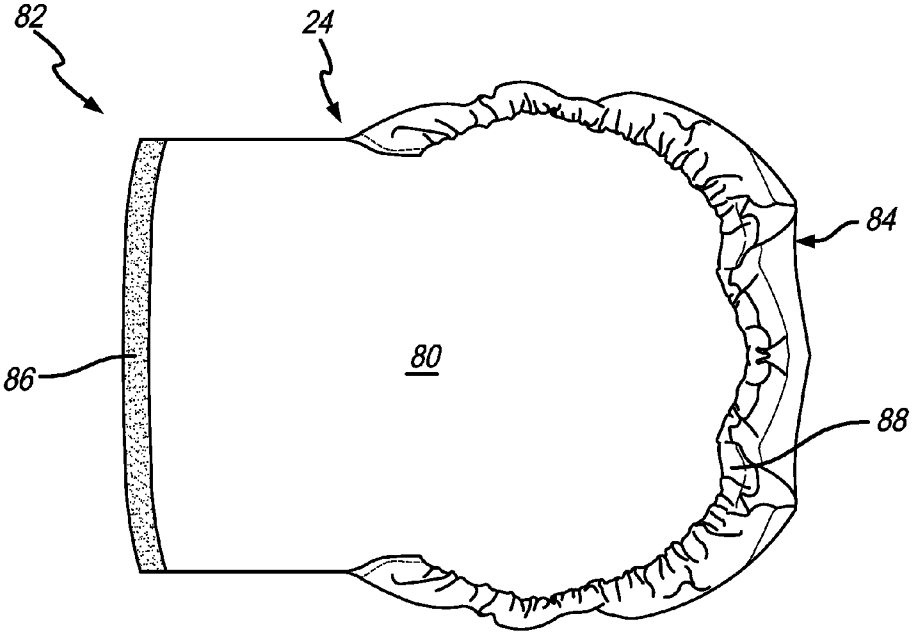
FIG. 8 is a bottom plan view of a cap having a size and shape for select attachment to the hinged lid of the container.

In another aspect of the container cover 20, the cap 24 is illustrated in more detail in FIG. 8 and may include a generally planar, yet flexible fabric cover surface 80 designed to generally encompass the lid 30. In this respect, the cap 24 includes a rear end 82 shown in FIG. 8 in a generally rectangular configuration, and a substantially rounded front end 84. The rectangular rear end 82 may include a strip of hook and loop fasteners 86 that may span part or the entire width of the rear end 82, as shown. The substantially rounded front end 84 may further include an integrated elastic cinching band 88 that causes the front end 84 to wrinkle when contracted. In this respect, when fully outstretched, the material of the rounded front end 84 is preferably larger than the lid 30, whereby the rounded front end 84 may be stretched to generally encompass the periphery of the lid 30. As such, the elastic cinching band 88 can be drawn to pull the excess material of the front end 84 closer together to secure the cap 24 to the container lid 30 via interference fit. The elastic cinching band 88 may include a stop (not shown) that permits the elastic to remain in a contracted state whereby the cap 24 remains in interference fit with the outer periphery of the lid 30, to ensure the cap 24 remains on the lid 30. The elastic cinching band 88 may alternatively be formed from a non-elastic belt or band capable of expanding and/or contracting to various lengths to fit the lid 30 for select engagement therewith and/or removal therefrom.

Figure 9:
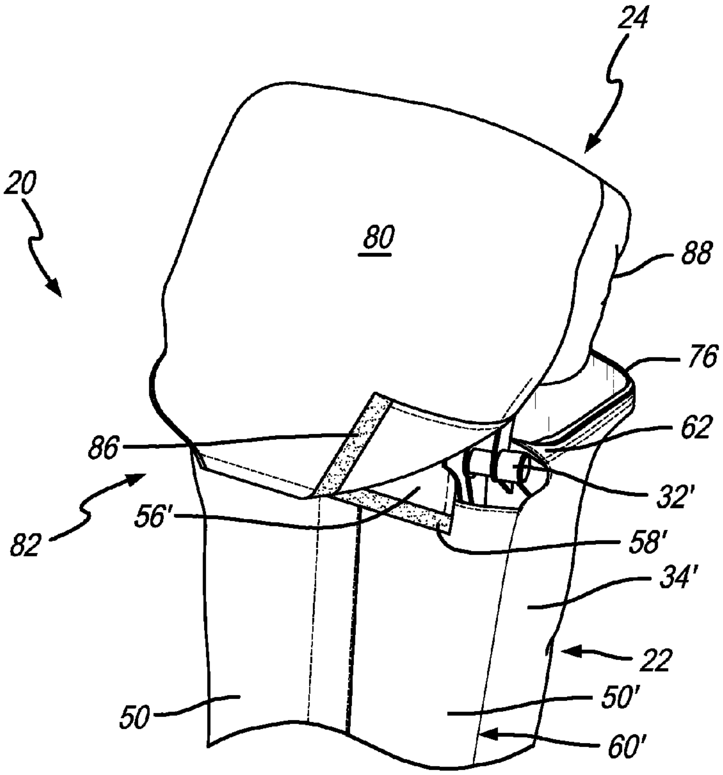
FIG. 9 is a rear perspective view of the container wrapped with the lower skirt, and further illustrating attaching the cap to the hinged lid.
Figure 10:
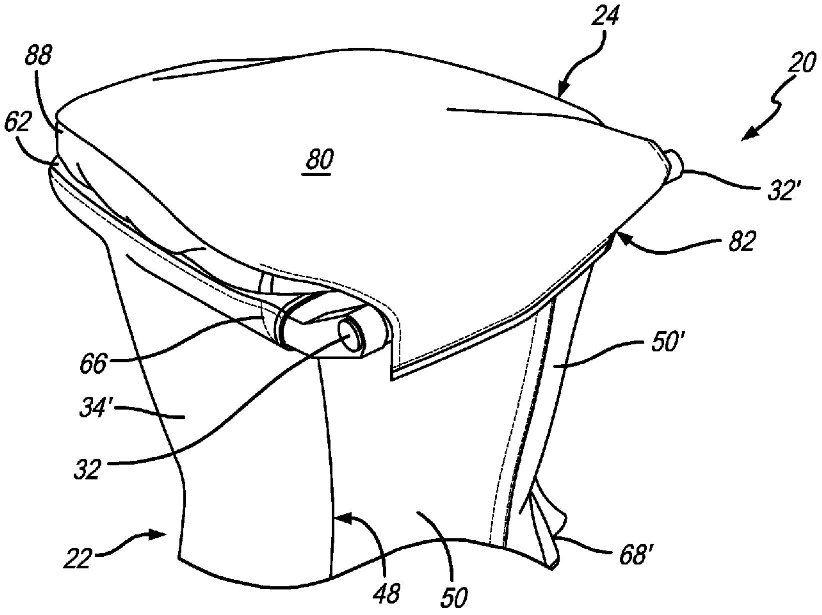
FIG. 10 is a rear perspective view of the container wrapped by the skirt, further illustrating attachment of the cap to the lid.

As shown in FIGS. 9-10, when the front end 84 is attached to the lid 30 with the cinching band 88, as described above, the cover surface 80 generally encompasses an outer surface area of the lid 30. In this respect, the rear end 82 extends rearward over the top of the handle 42 to cover the container handle 42 and the hinges 32, 32', thereby positioning the strip of hook and loop fasteners 86 for engagement with the outer hook and loop strips 58, 58' on the anchoring tabs 56, 56'. Thus, both the rear end 82 and the front end 84 are able to secure to the lid 30, while simultaneously allowing the lid 30 to pivot about the hinges 32, 32' between a closed position (e.g., FIG. 1) overlying the aperture 46 and an open position (e.g., FIGS. 7 and 11) exposing the aperture 46, all without removal of any aspect of the container cover 20 (e.g., the skirt 22 and/or the cap 24).

FIG. 12 is an enlarged perspective view taken about the circle 12 in FIG. 11, and more specifically illustrates the orientation of the panel section 34' relative to the anchoring tab 56 that folds up underneath the handle 42. FIG. 12 also more specifically illustrates the contour of the lip 62 form fit to the rim 44 (covered by the lip 62 in FIG. 12), the structure and location of the reinforcing seam 66, and the lip hem 76, once the skirt 22 is fully installed. In this respect, the hinge 32 and the container aperture 46 are illustrated as unobstructed and freely accessible, thus affording complete use of the refuse container 26 after installation of the container cover 20. Of course, the panel section 34', the anchoring tab 56, the lip 62, the reinforcing seam 66, and the lip hem 76 are similar (and reciprocal) on the other side of the refuse container 26.

Together, the skirt 22 and the cap 24 may cover almost the entire refuse container 26, thereby providing the desired aesthetics. For example, the container cover 20 may be a solid color, such as an earth tone color designed to blend in with a house (e.g., in an apartment or condominium complex) or yard. Alternatively, the skirt 22 and/or the cap 24 may include logos or other information, such as advertisements. The removable and/or replaceable aspect of the container cover 20 permits rotating such information (or colors) as needed and or desired, at a minimal cost relative to replacing the refuse container 26.

FIGS. 13-17 illustrate an alternative embodiment of a cap 24' further including an outer peripheral skirt 90 formed from an outwardly-projecting extension 92 (e.g., a rigid piece of plastic) sewn onto or otherwise integrated into the cap 24' generally above and encompassing the elastic cinching band 88. As shown best in FIGS. 13 and 14, one side of the extension 92 presented toward the rear end 82 of the alternative cap 24' includes a generally curved configuration that tracks and encompasses the elastic cinching band 88. The other side of the extension 92 is outwardly presented away from the elastic cinching band 88 and the rear end 82 and includes a forwardly presented straight front edge 94 with a generally straight right edge 94' and a generally straight left edge 94", the intersection of the front edge 94 with the right edge 94' forming a pointed corner 96 and the intersection of the front edge 94 with the left edge 94" forming a pointed corner 96'. As a result, and as shown best in FIGS. 15-17, the outer periphery of the alternative cap 24' has a cleaner box-like shape that hides the scrunched elastic cinching band 88 underneath.

In this respect, the alternative cap 24' includes a front longitudinal strip of material 98 sewn into and tracking the commensurate width of the straight front edge 94, a right longitudinal strip of material 98' sewn into and tracking the commensurate length of the straight right edge 94', and a left longitudinal strip of material 98" sewn into and tracking the commensurate length of the straight left edge 94". Each of the longitudinal strips 98, 98', 98" are biased outwardly and away from the interior of the alternative cap 24' by the relatively rigid outwardly presented extension 92. The longitudinal strips 98, 98', 98" are also sewn to each other thereby forming a vertical skirt seam 100 between longitudinal strips 98 and 98' and a vertical skirt seam 100 between longitudinal strips 98 and 98". Moreover, the alternative cap 24' may include a set of peripheral longitudinal seams 102, 102', 102" that track the respective longitudinal strips 98, 98', and 98" and parallel to the straight outward edges 94, 94', and 94" outwardly presented by the rigid extension 92. Additionally, a set of peripheral hems 104, 104', 104" may also be sewn onto the other longitudinal end of each of the longitudinal strips 98, 98', 98" on a side opposite the stitch connecting the longitudinal strips 98, 98', 98" about the edges 94, 94', 94" of the extension 92. Lastly, each of the right and left longitudinal strips 98', 98" may include a terminal skirt hem 106', 106" as shown with respect to FIGS. 13 and 17.

Figure 14:
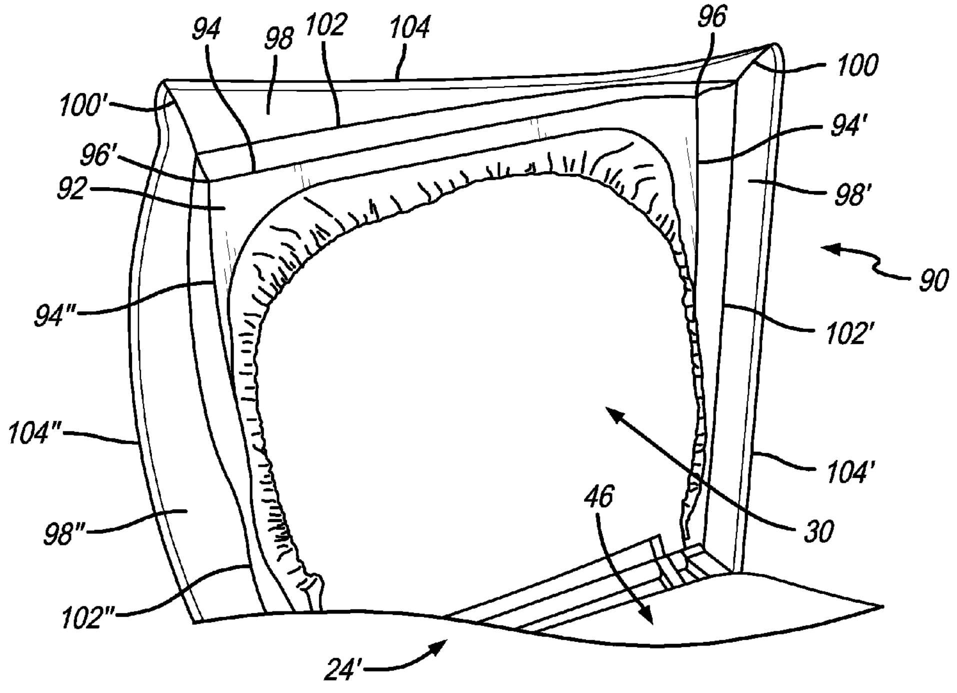
FIG. 14 is a perspective view of the container cover with the alternative cap of FIG. 13 installed onto the hinged lid of the refuse container, further illustrating the peripheral skirt draped around the exterior of the elastic cinching band after installation.
Figure 15:
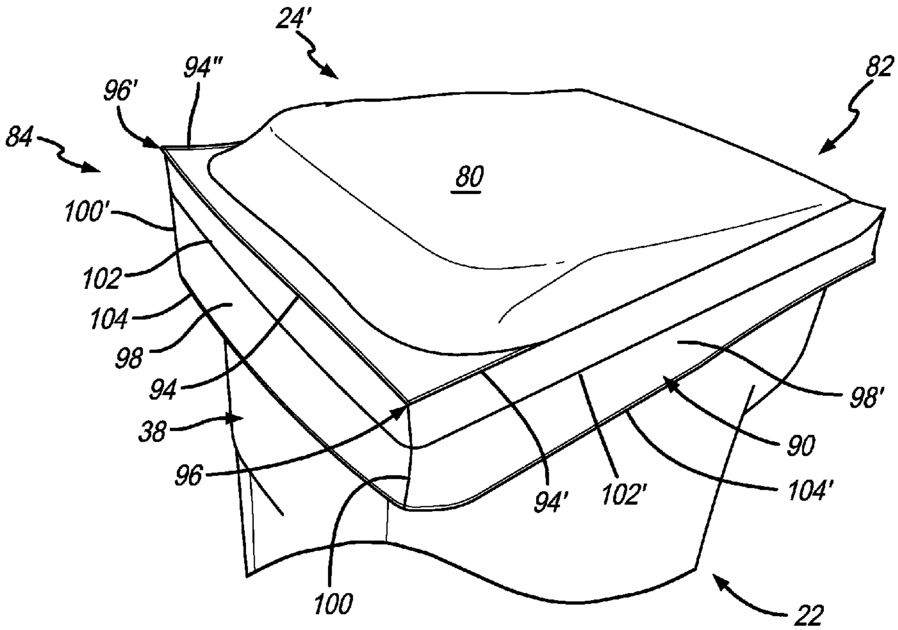
FIG. 15 is a perspective view illustrating the front and right sides of the alternative cap of FIGS. 13-14 installed on the hinged lid while in a closed position.
Figure 16:
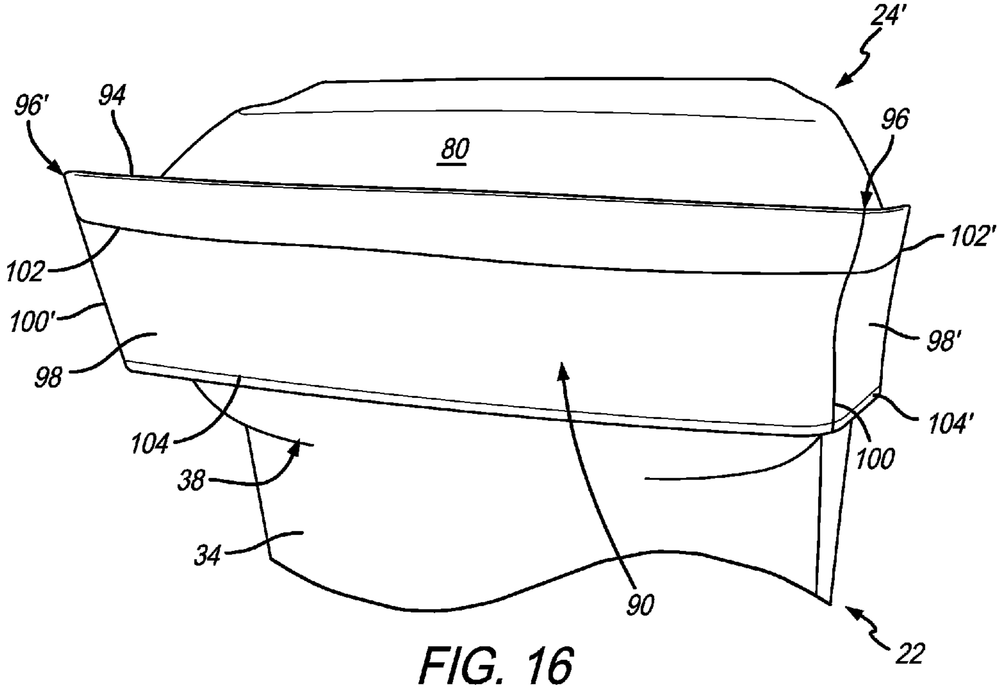
FIG. 16 is a front perspective view of the alternative cap of FIGS. 13-15 installed on the hinged lid while in the closed position.
Figure 17:
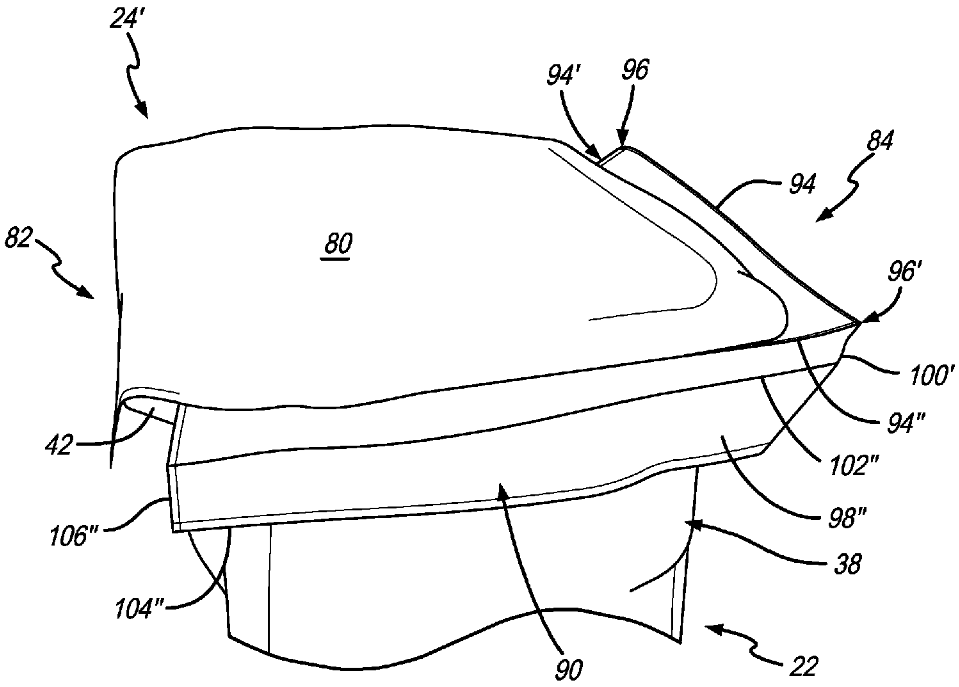
FIG. 17 is a left side perspective view of the alternative cap of FIGS. 13-16 installed on the hinged lid while in the closed position.

As shown in FIG. 14, the elastic cinching band 88 selectively secures the alternative cap 24' to the lid 30 in a similar manner as described above with respect to the cap 24, thus allowing for a complete range of motion of the lid 30 and unrestricted access to the container aperture 46. The rigid extension 92 extends outwardly from the elastic cinching band 88 substantially parallel to the orientation of the lid 30. Accordingly, the attached longitudinal strips 98, 98', 98" move with the rigid extension 92 as the lid 30 moves between an "open" position (FIG. 14) and a "closed" position (FIGS. 15-17). The longitudinal strips 98, 98', 98" may be made of the same or similar flexible yet durable fabric material as the skirt 22 and/or the cover surface 80. Alternatively, the longitudinal strips 98, 98', 98" may be made from a rigid opaque material that obscures the interface between the skirt 22 and the alternative cap 24', such as when the 30 is closed.

FIG. 15 illustrates the alternative cap 24' fitted to the lid 30 in the closed position. In this position, the extension 92 remains hidden underneath the longitudinal strips 98, 98', 98", as described above. When viewing the alternative cap 24' from the exterior when attached to the lid 30 in the "closed" position, the fabric covering the rigid extension 92 provides a uniform exterior appearance and may provide desired aesthetics (e.g., box-like shape with clean edges). The vertical skirt seams 100, 100' may track the general vertical length of the longitudinal strips 98, 98', 98", which may extend beyond the height of the lid 30 to seal off and hide the intersection of the lid 30 with the rim 44 of the refuse container 26. Overall, the front end 84 of the alternative cap 24' has a more box-like shape when the lid 30 is closed to completely obscure the container aperture 46 and the elastic cinching band 88.

Figure 13:
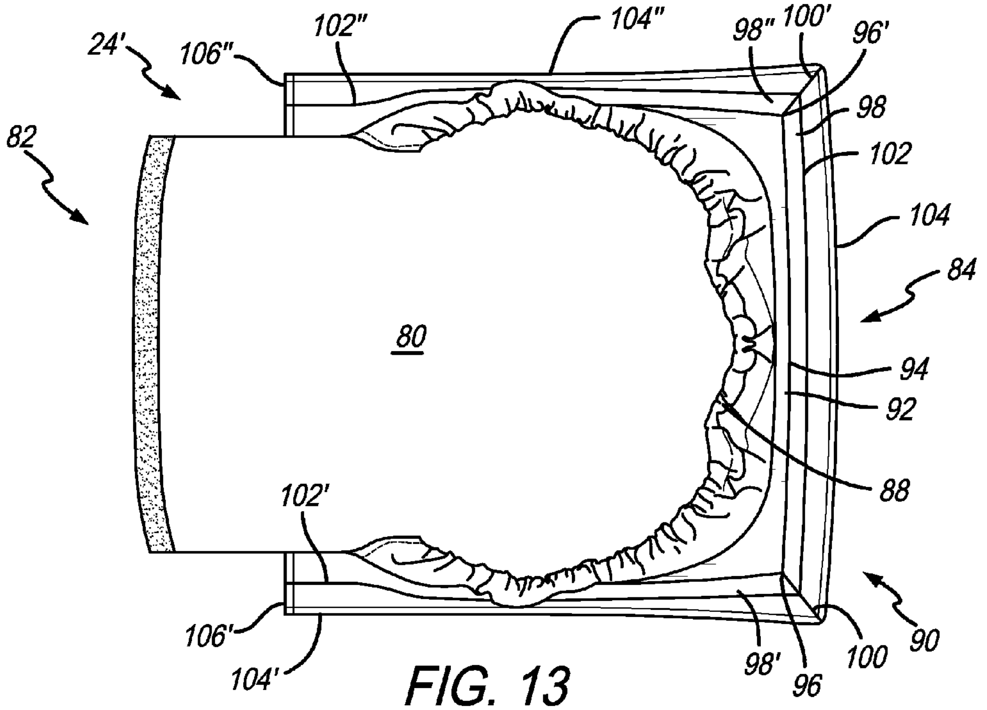
FIG. 13 is a bottom plan view of an alternative cap, including a rigid extension positioning a peripheral skirt around an exterior of an elastic cinching band.

FIG. 16 illustrates another front perspective view of the alternative cap 24' of FIGS. 13-15, more specifically illustrating the outwardly presented straight front edge 94 with the front longitudinal strip 98 extending downwardly therefrom. The front longitudinal strip 98 and the right longitudinal strip 98' are shown attached to the respective straight front edge 94 and the straight right edge 94', while the vertical skirt seam 100 provides an intersection therebetween, being angled inwardly and downwardly away from the pointed corner 96. The inward and downward extension of the vertical skirt seam 100 allows the peripheral skirt 90 to closely fit around the skirt 22 along the peripheral hems 104, 104', 104" thus maintaining a flat-sided box-like outward appearance of the alternative cap 24' when the lid 30 is closed. The contoured appearance of the skirt 22 is still visible below the peripheral hems 104, 104', 104", such as where the front panel section 34 wraps around the refuse container protrusion 38.

FIG. 17 illustrates another perspective side view of the alternative cap 24', further illustrating the rear end 82 wrapping around the container handle 42 and extending down for attachment to the outer hook and loop strips 58 and 58' (FIG. 6). As shown, the extension 92 projects outwardly from the cover surface 80 to ensure that the entire peripheral skirt 90 presents a more finished outward appearance when viewed from the front, left, and/or right sides. As in FIG. 16, the peripheral seam 100' may angle inwardly and downwardly away from the pointed corner 96', and toward the protrusion 38 covered by the skirt 22. The peripheral longitudinal seam 102" acts as a crease and allows the left longitudinal strip 98" to bend around at least a portion of the container rim 44 that may protrude beyond the lid 30. Finally, the peripheral hem 104" and left terminal skirt hem 106" complete the finished side exterior appearance of the alternative cap 24', while also preventing any unsightly edge fraying through repeated opening and closing of the lid 30.

While the embodiments of the caps 24, 24' are described above with respect to a flexible yet durable fabric material, the caps 24, 24' may alternatively be made from a flexible polymer or foil, or from a substantially form-fitting solid plastic or metallic material. One embodiment of the container cover 20 may include the skirt 22 and one of the caps 24, 24' being made of the same material. Alternatively, the skirt 22 and one of the caps 24, 24' may be made of different materials, and may be customized with markings and/or logos as mentioned above.

While the embodiments disclosed herein relate to one type of refuse container, persons of ordinary skill in the art will readily recognize that such features of the container cover 20 may be applicable to other refuse containers and the like having different sizes, shapes, configurations, and/or features.

Although several embodiments have been described in detail for purposes of illustration, various modifications may be made without departing from the scope and spirit of the invention. Accordingly, the invention is not to be limited, except as by the appended claims.

What is claimed is:

1. A cover for a container having an outwardly projecting handle, comprising:
- a skirt having a panel section for at least partially encompassing the container;
- an attachment mechanism disposed on one end of the panel section and being selectively engageable with an opposite end of the panel section to retain the skirt around the container and below the outwardly projecting handle;
- a lip projecting inwardly about an upper periphery of the skirt and having a size and shape relatively smaller than an upper rim of the container, the lip being configured for slide-on engagement and support by the rim; and
- a tab downwardly extending from the lip for placement underneath the outwardly projecting handle and for select engagement with the panel section such that the skirt, the panel section, the lip, and the tab cooperate to substantially cover the container, including in and around the outwardly projecting handle.

2. The cover of claim 1, wherein the panel section includes a front panel section and a pair of oppositely facing attachment flaps, the attachment mechanism for selectively securing the pair of attachment flaps below the outwardly projecting handle.

3. The cover of claim 2, wherein the attachment mechanism comprises an inner attachment strip coupled with one of the attachment flaps and an outer attachment strip coupled to another of the attachment flaps.

4. The cover of claim 3, wherein one of the inner attachment strip or the outer attachment strip comprises a plurality of hooks and the other of the inner attachment strip or the outer attachment strip comprises a plurality of hoops engageable by the plurality of hooks.

5. The cover of claim 2, including a pair of longitudinal edges transitioning the front panel section to the respective pair of attachment flaps at an angle of approximately 70 to 100 degrees.

6. The cover of claim 1, wherein the panel section includes an upper attachment strip selectively attachable to an inner attachment strip of the tab extending underneath the handle.

7. The cover of claim 1, wherein the tab includes an outer attachment strip selectively engageable with a cap having a size and shape to selectively encompass a lid pivotally coupled to the outwardly projecting handle.

8. The cover of claim 7, wherein a portion of an outer periphery of the cap is selectively expandable and/or contractible about the lid.

9. The cover of claim 8, including an elastic cinching band for expanding and/or contracting the portion of the outer periphery of the cap, the elastic cinching band including a stop for maintaining the portion of the outer periphery in a contracted position.

10. The cover of claim 9, wherein the cap includes a relatively rigid and outwardly presented extension having at least one longitudinal strip of material hanging therefrom at least partially obscuring the elastic cinching band.

11. The cover of claim 10, wherein the at least one longitudinal strip extends downwardly and inwardly from the outwardly presented extension and toward the skirt.

12. The cover of claim 7, wherein the cap includes a fastener for select attachment and retention with the outer attachment strip, the cap having a rear end with the fastener thereon for extending out from the lid, over the outwardly projecting handle and into contact with the outer attachment strip, thereby covering the lid and the outwardly projecting handle while simultaneously permitting pivoting movement of the lid relative to the handle without interference from the cap or the skirt.

13. The cover of claim 1, wherein the skirt, the lip, or the tab comprises a flexible material selected from the group consisting of a fabric, a polymer, and a foil material.

14. The cover of claim 1, wherein the skirt includes at least one pleat having a size and shape to fit over and accommodate rolling motion of an underlying wheel.

15. A cover for a container having an outwardly projecting handle, comprising:
- a skirt having a panel section and a pair of oppositely facing attachment flaps for at least partially wrapping around the container;
- an attachment mechanism disposed on at least one end of one of the pair of oppositely facing attachment flaps and being selectively engageable with the other of the pair of oppositely facing attachment flaps to retain the skirt around the container and below the outwardly projecting handle;
- a lip projecting inwardly about an upper periphery of the skirt, the lip being configured for slide-on engagement and support by a rim on the container;

a tab downwardly extending from the lip for placement underneath the outwardly projecting handle and including an outer attachment strip; and a cap having a size and shape to selectively encompass a lid pivotally coupled to the outwardly projecting handle and including a rear end with a fastener thereon extending out from the lid, over the outwardly projecting handle and into select attachment and retention with the outer attachment strip of the tab such that the skirt, the panel section, the attachment flaps, the lip, the tab, and the cap cooperate to substantially cover the container, including in and around the outwardly projecting handle, while simultaneously permitting pivoting movement of the lid relative to the handle without interference from the cover.

16. The cover of claim 15, wherein the attachment mechanism comprises an inner attachment strip coupled with one of the oppositely facing attachment flaps and an outer attachment strip coupled to another of the oppositely facing attachment flaps, wherein one of the inner attachment strip or the outer attachment strip comprises a plurality of hooks and the other of the inner attachment strip or the outer attachment strip comprises a plurality of hoops engageable by the plurality of hooks.

17. The cover of claim 15, including a pair of longitudinal edges transitioning the panel section to the respective pair of attachment flaps at an angle of approximately 70 to 100 degrees and wherein each of the oppositely facing attachment flaps include a respective upper attachment strip selectively attachable to an inner attachment strip of the tab extending underneath the handle.

18. The cover of claim 17, wherein a portion of an outer periphery of the cap is selectively expandable and/or contractible about the lid with an elastic cinching band, the elastic cinching band including a stop for maintaining the portion of the outer periphery in a contracted position.

19. The cover of claim 18, wherein the cap includes a relatively rigid and outwardly presented extension forming at least a relatively straight front edge, a relatively straight right edge, and a relatively straight left edge with each of the straight, right, and left edges having a longitudinal strip of material hanging therefrom and substantially concealing the elastic cinching band thereunder.

20. The cover of claim 15, wherein the skirt, the lip, or the tab comprises a flexible material selected from the group consisting of a fabric, a polymer, and a foil material and wherein the skirt includes at least one pleat having a size and shape to fit over and accommodate rolling motion of an underlying wheel.

21. A cover for a container having an outwardly projecting handle, comprising:

a skirt having a front panel section and a pair of attachment flaps for at least partially wrapping around the container, wherein each of the attachment flaps include an upper attachment strip;

an inner attachment strip coupled to one of the pair of attachment flaps and an outer attachment strip coupled to another of the pair of attachment flaps, the inner and outer attachment strips being selectively engageable with one another to retain the skirt around the container and below the outwardly projecting handle;

a lip projecting inwardly about an upper periphery of the skirt and having a size and shape relatively smaller than an upper rim of the container, the lip being configured for slide-on engagement and support by the rim;

a tab downwardly extending from the lip for placement underneath the outwardly projecting handle and including a lower attachment strip for select engagement with the upper attachment strip; and a cap having a size and shape to selectively encompass a lid pivotally coupled to the outwardly projecting handle and including a fastener for extending out from the lid, over the outwardly projecting handle and into select attachment with the tab, a portion of an outer periphery of the cap being selectively expandable and/or contractible about the lid, wherein the skirt, the front panel section, the pair of attachment flaps, the lip, the tab, and the cap cooperate to substantially cover the container, including in and around the outwardly projecting handle, while simultaneously permitting pivoting movement of the lid relative to the handle.

22. The cover of claim 21, including a pair of longitudinal edges transitioning the front panel section to the respective pair of attachment flaps at an angle of approximately 70 to 100 degrees, wherein one of the inner attachment strip or the outer attachment strip comprises a plurality of hooks and the other of the inner attachment strip or the outer attachment strip comprises a plurality of hoops engageable by the plurality of hooks.

23. The cover of claim 21, including an elastic cinching band for expanding and/or contracting a portion of the outer periphery of the cap, the elastic cinching band including a stop for maintaining the portion of the outer periphery in a contracted position, wherein the skirt, the lip, or the tab comprises a flexible material selected from the group consisting of a fabric, a polymer, and a foil material and wherein the skirt includes at least one pleat having a size and shape to fit over and accommodate rolling motion of an underlying wheel.

24. The cover of claim 21, wherein the cap includes at least one extension segment projecting outwardly from the cap and having at least one hanging segment projecting downwardly from an outer most edge of the at least one extension segment.

* * * * *